Dec. 5, 1961 A. W. KELLY, JR., ET AL 3,012,082
METHOD OF SUPPLYING GASEOUS MATERIAL
Filed June 14, 1957 2 Sheets-Sheet 1

INVENTORS
ARTHUR W. KELLY, JR.
ROBERT W. PFEIFFER
BY
AGENT
ATTORNEY

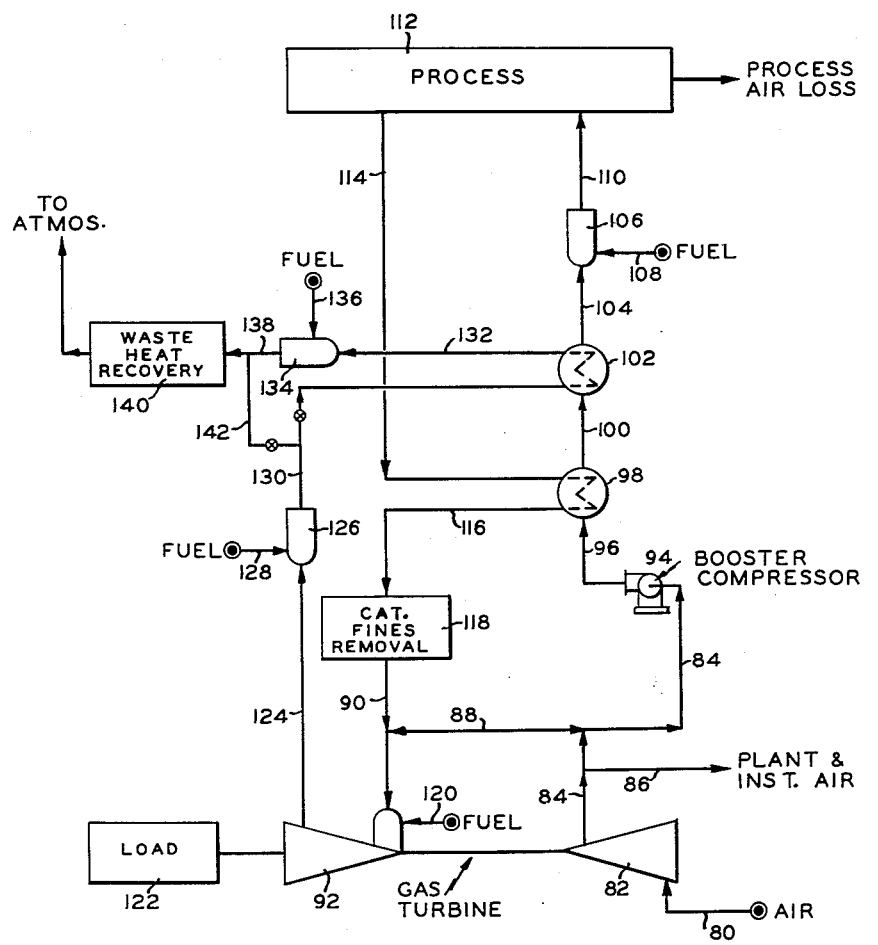

United States Patent Office 3,012,082
Patented Dec. 5, 1961

3,012,082
METHOD OF SUPPLYING GASEOUS MATERIAL
Arthur W. Kelly, Jr., Riverdale, and Robert W. Pfeiffer, Bronxville, N.Y., assignors to The M. W. Kellogg Company, Jersey City, N.J., a corporation of Delaware
Filed June 14, 1957, Ser. No. 665,823
10 Claims. (Cl. 260—680)

This invention relates to an improved method for supplying large volumes of air or the like to various processes. In one aspect it relates to a process wherein a gas turbine is integrated in a process such that a gaseous material is supplied at the required volume, temperature and pressure.

In recent years conversion processes have gained prominence in the conversion of hydrocarbons and in all processes, whether in a fixed bed, moving bed or a dense fluidized bed, hydrocarbon vapors are contacted with a suitable catalyst or inert contact material at elevated temperature and pressure conditions whereby the hydrocarbon is converted to yield more valuable products. However, during such conversion processes the catalyst or solid contact material gradually becomes contaminated by carbonaceous deposits which reduce the activity of the catalyst or contact material. As a result, after a certain residence time in the conversion zone, the contact material must be regenerated by combustion of the carbonaceous deposits. The cost of the required apparatus necessary to provide the regeneration air in sufficient quantities constitutes one of the large cost items in the operation of such conversion processes. Consequently, the regeneration stage often limits the overall conversion capacity of a given commercial unit.

Another inherent disadvantage of the prior art process discussed above is the large process gas compression plant which is needed to deliver the reactor effluent hydrocarbon products from a low pressure of about 10 p.s.i.a. or less to the gas recovery system at approximately 160 p.s.i.g. If the process gas compressor is driven by a condensing steam turbine, the overall thermal efficiency of the steam cycle might be about 18 percent when referred back to the fuel fired in furnaces to generate the motive steam.

Accordingly, it is an object of this invention to provide an improved system for economically supplying large volumes of gaseous material at an elevated temperature and pressure.

It is another object of this invention to provide an improved method of regeneration for a catalytic conversion process.

It is still another object of this invention to provide a process of improved thermodynamic efficiency for supplying regeneration gases.

It is still a further object of this invention to improve the method of supplying the endothermic heat requirements for a catalytic dehydrogenation process.

Other objects and advantages of the present invention will become apparent to those skilled in the art from the following description.

Accordingly this invention is directed to an improved method for supplying large volumes of gaseous material to processes employed in various catalytic, chemical, metallurgical and thermal processes. This new and improved method utilizes a gas turbine-compressor in combination with a booster compressor to simultaneously supply air or gaseous material to the process and also provide additional prime mover power output which may be equal essentially to the horsepower rating of the gas turbine-compressor and which may be used for purposes other than supplying air in a more efficient and economical manner. The power requirements of the fixed load can be obtained at a high thermal efficiency through use of the exhaust air from the turbine which is passed through a waste heat recovery section.

The present invention is directed in one aspect to an improved method of employing a gas turbine-compressor, booster-compressor combination for regenerating a bed of catalyst employed in the conversion of hydrocarbons wherein carbonaceous material is deposited on the catalyst which is periodically removed by the process involving; compressing regeneration gas to an elevated pressure in the compressor zone of a fired turbine-compressor prime mover, passing the compressed gas to a booster compressor provided to overcome the pressure drop of the process, preheating by indirect heat exchange to an elevated temperature of about 1000° F. said pressurized regeneration gas, further heating to a temperature of about 1200° F. said preheated pressurized regeneration gas by direct combustion of a combustible material therewith and passing said heated regeneration gas at said elevated pressure to said catalyst bed to remove carbonaceous material therefrom, removing regeneration effluent gases from said catalyst bed, passing said regeneration effluent gases at an elevated temperature and pressure to said indirect heat exchange step and passing the regeneration effluent gases from said indirect heat exchange step to said turbine.

In another aspect, the improved process of the present invention supplies regeneration air or suitable gaseous material of controlled water content to the process. In this embodiment, the air flows through the regeneration system by: (1) atmospheric air is compressed to an elevated pressure by the fired turbine-air compressor prime mover, (2) the compressed air is passed to a booster-compressor, (3) the pressurized air is heated to regeneration temperature by either direct and/or indirect heat exchange. In those cases where the water content of the regeneration air is limited due to the sensitivity of the catalyst thereto, then the quantity of fuel which may be fired is also limited due to the water formed during combustion. The additional heat required above that amount supplied by direct firing is supplied by indirect heat exchange with hot exhaust gases from the process as hereinafter described. When the rated air flow of the gas turbine is greater than the flow required for regeneration, then excess air is bypassed through a suitable unrestricted bypass conduit for free flow of gas from the gas turbine compressor discharge or outlet to the inlet of the turbine combustion chamber of regeneration effluent air. The quantity recycled or bypassed to the booster compressor may be passed through a second conduit parallel to said unrestricted conduit and regulated by a valve connected to a suitable recorder or regulator. In the event that it is desired to regenerate with temperatures lower than the compressor discharge temperature, heat may be removed by any suitable method from the compressed gas between compression zones and/or after the booster compressor, (4) the hot combustion air recovered from the heat exchange steps is then passed through the process to regenerate the catalyst, (5) the regeneration effluent gases leaving the process may then be passed through a catalyst fines removal system, if desired, to remove entrained fines contained therein, (6) the effluent regeneration air plus any bypassed air from the first compressor is then fired in the turbine combustion chamber, expanded and flows through the turbine, thereby providing power to drive the air compressor and provide additional excess power which may be used for external shaft loads, (7) the exhaust air from the turbine which is at approximately atmospheric pressure is then refired and may be passed in indirect heat exchange with the high pressure air from the compressor discharge or passed directly to steam generation, (8) the regeneration effluent air from the indirect heat exchange step may again be refired in a direct fired heater to provide additional heat to a waste heat recovery system such as steam generation and then removed from the process.

The catalysts employed in the conventional dehydrogenation process, such as a chromia-alumina catalyst, are sensitive to certain impurities such as water, various metals and sulfur. Consequently, there are limitations on the type of fuel as well as the quantity which can be burned if a direct fired air heater (the cheapest method) is used to heat the air to a temperature suitable for regeneration of the catalyst of from about 1050° F. to about 1175° F. Since the catalyst is sensitive to the water vapor content of the regeneration gas at the inlet to the reactors it is essential to maintain the water vapor content of the regeneration gas at a very low value while the oxygen content has been found to be limited to about 5.0 mol percent minimum or less for efficient regeneration of the catalyst. Accordingly, residual fuels and gas oils are generally unsuitable for the direct fired air heater because of their metals and sulfur content, while a fuel gas which has a high-hydrogen content may limit the total pressure at which the regeneration can be carried out. Therefore, applicants' invention is in part directed to developing a regeneration system which overcomes the limitations of water partial pressure and mol percent oxygen available for regeneration, thereby providing greater flexibility in the selection of regeneration pressure and allowing the use of high-hydrogen content fuels.

Applicants improved system may be effectively employed in a variety of different processes, particularly those requiring large volumes of gaseous material, whether inert or active in the process at elevated pressures with or without elevated temperatures. Furthermore, in processes employing air or oxygen containing gases, the flexibility of applicants' process enables varying the oxygen content of the gases from about 0 percent to about 100 percent by volume, depending upon the demands of the process to which it is applied. Some of the processes to which applicants' improved system may be applied are those involving hydrocarbon conversion, thermal processes, chemical and metallurgical processes or any other processes requiring large volumes of gaseous material at elevated pressures. The processes to which applicants' improvement is particularly applicable are those involving oxidation, such as catalyst regeneration in either fluid bed, moving bed or fixed bed operations.

Other processes to which the present invention is applicable are those involving such processes as fluid hydroforming, low temperature carbonization, tonnage oxygen, ammonia synthesis, nitric acid, and partial oxidation processes such as ethylene oxide, propylene oxide, acrolein, phenol acetone by cumene oxidation, and acetic acid.

In one embodiment, air for regeneration of the catalyst in a catalytic dehydrogenation reactor system is first compressed in a range from about 50 to about 150 p.s.i.a., preferably from about 65 to about 90 p.s.i.a. The compressed air is then preheated by indirect heat exchange with hot regeneration effluent gases to be more fully described hereinafter, and the thus preheated regeneration air under pressure is further heated to the desired temperature of about 1175° F. in a direct fired burner before being passed to the reactor or reactors to be regenerated in a cyclic process. The amount of heat input to the regeneration air by indirect heat exchange as compared to that furnished by direct firing fuel is determined by the process requirement for maintaining the water partial pressure of the regeneration gases below about 5 p.s.i.a.

In one embodiment of this invention applicants' regeneration system includes a fired turbine-compressor unit, the excess brake horsepower (B.H.P.) of the fired turbine over that required to drive its associated air compressor being used to drive, for example, the process gas compressor for the product recovery section of the process or any other equipment requiring external power.

In another embodiment of this invention, steam generated in the process or air is bled to the fired turbine during the "bump" or surge period of the process controlled by a suitable cycle timer arrangement without affecting the composition of the regeneration air required in the process or the water vapor content of the regeneration gases admitted to the reactors.

An important improvement of the present invention lies in the unrestricted flow of compressed air or oxygen containing gas to the turbine inlet from the first compressor outlet to assure the supply of sufficient oxygen to the turbine to sustain combustion.

In another embodiment, the fired turbine exhaust gases of reduced temperature and pressure, approximately atmospheric or above, are passed to a direct fired burner which raises the temperature of the gases to a level sufficiently elevated to give the desired preheat indirectly to the regeneration air discharged from the compressor in an indirect heat exchanger. From the preheat exchanger the regeneration effluent gases are passed to another direct fired burner, the hot gases of which are used to produce process steam.

An outstanding improvement that the present invention provides in supplying air or oxygen containing gases to oxidation processes lies in the technique of installing a gas turbine which as a prime mover usually need only be rated at the power required to drive the external shaft load. Accordingly, the process air requirement for regeneration is supplied through the use of a booster compressor which takes suction directly from the high pressure interconnecting piping of the gas turbine and returns this air to the piping at essentially the same pressure. In the event that the air quantity available from the gas turbine air compressor is below the process requirement, the booster compressor simply recycles the required incremental amount of air from the process outlet or regeneration effluent back to the regeneration process inlet by the interconnecting piping. If the air from the compressor of the gas turbine exceeds the process requirement, the excess air passes directly to the turbine by the interconnecting piping and simply bypasses the process. The large interconnecting piping of the gas turbine is provided to have negligible or substantially no pressure drop and hence the regeneration process circuit and process pressure drop has no effect on the operation of the fired turbine or its fixed load. The booster compressor provides only sufficient head to overcome the pressure drop in the regeneration circuit and may be driven by any prime mover such as a gas turbine, a steam turbine employing steam developed as herein described, motor, etc., or may even be driven by the aforementioned gas turbine-compressor prime mover, depending on the available excess horsepower over the external fixed load requirement. Since the gas turbine driving the process gas compressor may be considered to operate essentially independently of the regeneration circuit, the external load may be started independently of the booster compressor, if desired, then the booster compressor subsequently started to provide the regeneration air for the process.

On the other hand, for use in obtaining a steam supply to start the gas turbine, the booster compressor may be provided with suitable piping to force atmospheric air, either directly or via the process, to the waste heat boilers where it may be fired to generate steam. Similarly, on shutdown operations the booster compressor may be used to force cooling air through the process even though the gas turbine-compressor unit is shutdown.

In another embodiment, the regeneration air circuit is very similar to the outline given hereinbefore in that, (1) the bypass line from the compressor discharge to the turbine inlet is an open line with no valves or restrictions whatsoever and as such is considered to have negligible pressure drop. In the event that it is desired to operate this regeneration system with a controlled recycle, an extra recycle line or conduit may be placed in parallel with the bypass conduit, (2) with the booster compressor installed in what may be called the regeneration circuit, the pressure drop can be varied to obtain the minimum overall investment, (3) immediately following the booster compressor is a high pressure flue gas indirect heat exchanger which handles the reactor regeneration effluent on the hot side and the booster compressor effluent on the cold side. This exchanger supplements the exchanger which has turbine exhaust gases on the hot side as mentioned hereinbefore. One advantage of the high pressure flue gas exchanger is to reduce the temperature of the effluent air from the reactor to simplify the problem of catalyst fines removal and to decrease the control problems on the turbine. Variation to this may be made such as elimination of either the high pressure flue gas exchanger or the low pressure flue gas exchanger.

In another embodiment of the improved regeneration system of this invention the system may be as described above, except that the high pressure regeneration air passes first through a water knock-out system before reaching the booster compressor. In those processes where the moisture content of the regeneration air is limited, this improvement vastly improves the LMTD (logarithmic mean temperature differential) on the flue gas heat exchangers because the resultant low water partial pressure allows more fuel to be fired with the fresh regeneration air to elevate the temperature thereof prior to entering the reactors. As a result of the lower temperature level required, cost of the booster compressor and its driver, as well as cost of the flue gas exchanger, may be considerably decreased. Auxiliary equipment required with this improvement consists of a spray water cooler utilizing sufficiently pure water or condensate as a cooling medium and a separate cooling tower, when required, for the condensate to avoid contamination with the chlorine and salts normally found in the main cooling water tower. However, it is contemplated within this embodiment that the main cooling tower water can be used as the cooling medium in the spray water cooler, if it is determined that the minerals in the main cooling tower water will not hurt the catalyst employed in the process, thereby eliminating the condensate cooling tower. This condensate water knock-out design possesses the same operational advantages as the above design. It is also contemplated within the scope of this invention to employ other types of cooling means, such as a surface cooler or indirect heat exchanger or other systems which will remove excess water contained in the regeneration gases. Furthermore, in either the hot booster compressor process or the process employing the water knock-out or dehumidification steps, the process may be operated with or without the restricted recycle or by-pass conduit containing a control valve.

It is believed that the present invention may be best described by reference to the accompanying drawings which show the inventive features of the present invention as applied, for example, to the regeneration system for a catalytic dehydrogenation process.

FIGURE 2 is a diagrammatic illustration in elevation of an arrangement of apparatus of another embodiment of the present invention employing a hot booster compressor in the system for supplying regeneration gases at elevated pressure and temperature.

Figure 1:
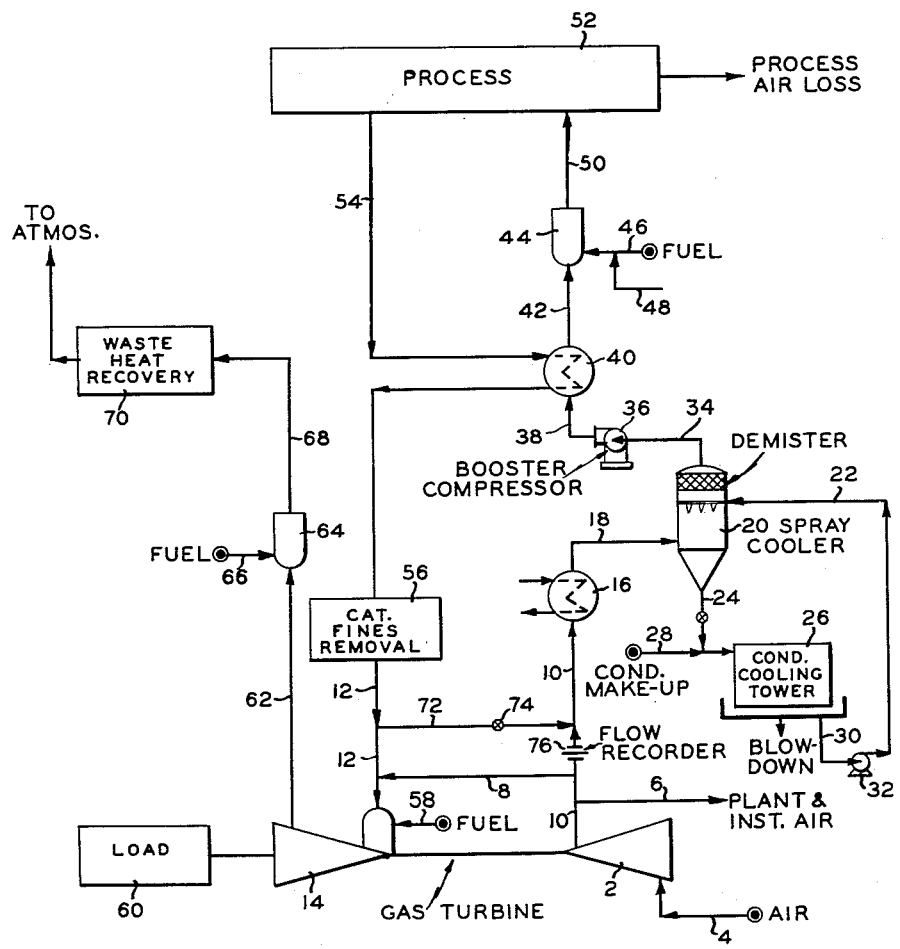
FIGURE 1 is a diagrammatic illustration in elevation of an arragement of apparatus of one embodiment of the present invention employing dehumidification apparatus in the system for supplying regeneration gases at an elevated pressure and temperature.

The application of the improved method of supplying regeneration air to a dehydrogenation process for the production of 40,000 tons per year of butadiene is illustrated in the attached drawings. This technique as it is adapted to the dehydrogenation process utilizes a booster compressor in conjunction with a gas turbine to simultaneously provide the large quantity of regeneration air required for the process and the power to drive the process gas compressor. The use of the improved gas turbine-compressor and booster compressor system proposed by applicants results in substantial utility savings for the process. In addition, this system allows the regeneration to take place at elevated pressure of about 70 to about 100 p.s.i.a., preferably about 90 p.s.i.a, thereby making it economical to reduce the number of reactors undergoing the regeneration "air blow" operation from 2 to 1 for a 40,000 tons per year butadiene unit. In the dehydrogenation of hydrocarbons, for example, the dehydrogenation of butane to butylene or butadiene in a plurality of fixed bed reactors, the process is carried out at temperatures above about 1050° F. and usually at low pressures. In general, temperatures between about 1050° F. and about 1300° F. are suitably employed.

Referring now to FIGURE 1 of the drawings, which represents a regeneration process for a plant to produce 40,000 tons per year of butadiene, air at a rate of approximately 660,000 pounds per hour is admitted by conduit 4 to compressor 2. The air compressor 2 of the gas turbine compresses approximately 660,000 pounds per hour of atmospheric air at about 80 percent relative humidity, a temperature of about 80° F. and a pressure of about 13.2 p.s.i.a., introduced by conduit 4 to a pressure of about 78 p.s.i.a. and a temperature of about 500° F. This air flow includes process air loss that occurs during depressuring as well as plant and instrument air of about 4600 pounds per hour which is taken off at the discharge end of the air compressor by conduit 6. An unrestricted bypass conduit 8 is provided connecting the compressor discharge conduit 10 to the turbine combustion chamber inlet conduit 12 to maintain equal pressures at both points. Conduit 8 will either bypass air from the compressor 2 to the turbine 14 or recycle air to the process depending on the size of the gas turbine actually installed and the air requirements of the process. Fluctuation of the fresh inlet air to the turbine with changes in the ambient temperature will also affect the recycle quantity. The compressed fresh air and the recycle effluent stream (if needed) in conduit 8 is then passed in this embodiment by conduit 10 at a rate of about 720,770 pounds per hour and a temperature of about 524° F. to a deaerator feed water heat exchanger 16 having a capacity of about 35 mm. B.t.u.'s per hour which cools the air stream from about 524° F. to about 331° F. Indirect heat exchanger 16 minimizes the heat surrendered to the condensate in spray cooler 20 or water knock-out step hereinafter described. The partially cooled air stream recovered from indirect heat exchanger 16 is then passed by conduit 18 to spray cooler 20 wherein the compressed air is cooled to about 80° F. and dehumidified. Other suitable means of cooling and dehumidification may be employed such as surface coolers, etc. Dehumidification is advantageous for the process since the quantity of fuel that can be fired directly with the air is limited by the partial pressure of water in the regeneration air. Generally the water partial pressure should be below about 5 p.s.i.a. In the event water partial pressure is not a limitation in the process, the dehumidification step may be omitted as shown in FIGURE 2. Pure condensate is used as the cooling medium in spray cooler 20 which is introduced by conduit 22 at a temperature of about 70° F. to avoid contamination of the compressed regeneration air with the chlorine and/or salts found in ordinary cooling water. The water condensate is withdrawn from the bottom of cooler 20 by conduit 24 and is passed to a separate condensate cooling tower 26 which operates with approximately 6 percent liquid blow down. The condensate make-up is added by conduit 28 at a rate of about 200 gallons per minute (g.p.m.). The cooled condensate is then recovered and removed from the bottom of the condensate tower by conduit 30 containing pump 32 and returned to the cooling tower 20 by conduit 22 as hereinbefore described. The cooled and dehumidified air at a temperature of about 80° F. and a pressure of about 76 p.s.i.a. is removed from the top of spray cooler 20 at a rate of about 711,660 pounds per hour and passed by conduit 34 to booster compressor 36. The booster compressor 36 located just after the spray cooler 20 does, in effect, in this system the actual work of supplying the regeneration air to the process. The power requirement of the booster compressor is much less than the requirement of a low pressure regeneration air compressor because of the elevated pressure employed in the process. The booster compressor provides only sufficient head to overcome the pressure drop in the regeneration system and return the air to the turbine inlet at substantially the same pressure as the air compressor discharge. With the booster compressor installed in this manner, the regeneration system pressure drop can be varied to obtain the minimum investment. By placing the spray cooler before the booster compressor its power requirements and size are substantially reduced. The booster compressor raises the pressure of the air to about 94 p.s.i.a., and a temperature of about 126° F. and thereafter is passed by conduit 38 to indirect heat exchanger 40 having a capacity of about 66 mm. b.t.u.'s per hour. In heat exchanger 40 the regeneration air is heated by indirect heat exchange with the hot effluent regeneration air in conduit 42 obtained from the process as described hereinafter. The quantity of heat that may be exchanged in indirect heater 40 is the difference of the heat required to raise the air temperature from about 126° F. to about 1175° F. and the allowable heat that may be obtained by direct firing. Dehumidifying the air in the spray cooler previously described improves vastly improves the LMTD (logarithmic mean temperature differential) of the flue gas heat exchanger because the quantity of fuel that may be fired in the direct fired air heater hereinafter described is substantially increased. The preheated regeneration air recovered from indirect heat exchanger 40 is then passed by conduit 42 at a temperature of about 500° F. to direct fired heater 44. In direct fired heater 44 or burner 44 the remaining heat (about 128 mm. b.t.u.'s per hour) that is added to the regeneration air stream in order to reach regeneration temperature is obtained by direct firing. In this step, depropanizer tail gas for example or any other fuel substantially free of solids, metals and sulfur is introduced by conduit 46 and fired to impart the necessary heat to the regeneration air. In burner 44, sufficient quantity of fuel is burned to raise the temperature of the air for regeneration from about 500° F. to about 1175° F. In the event that insufficient tail gas is available for use in burner 44, the remainder of the required heat may be provided by firing methane or other suitable fuel introduced by conduit 48 to conduit 46. After the air has been heated by burner 44 to regeneration temperature of about 1175° F., it is passed at a rate of about 717,700 pounds per hour through conduit 50 to the reactor or reactors requiring regeneration represented by box 52. The reactor containing the dehydrogenation catalyst to be regenerated is contacted with the preheated regeneration air to burn off the coke and even out the temperature profile of the catalyst bed. The cyclic method for operating a plurality of reactors wherein a reactor consecutively passes through reaction, purge, regeneration, purge and reaction is a part of this invention only to the extent that the regeneration gases are passed to the proper reactor at the proper time in order to purge the catalyst and remove the carbonaceous deposits from the catalyst and supply the necessary heat to the catalyst bed for the dehydrogenation reaction. However, this invention is particularly applicable in a multiple reactor system in which at least one reactor is normally on regeneration at any one time. During this time, which is equal to approximately one half of the reaction time, the same total air flow passes through the reactor as would be passed through a reactor system which employs another reactor in parallel for the full reaction period. That is, the air flow rate is doubled and the time cut in half, thus maintaining the same "air blow" in both cases. In this embodiment the efficiency of regeneration of the one reactor is equivalent to the regeneration that would be obtained at low pressures with two reactors in parallel. The catalyst bed pressure drop is approximately the same for both cases and the rise in temperature of the catalyst during the coke burn off will not vary substantially because a major portion of the oxygen in the air is consumed during the burn off period of both cases. Because substantially all of the oxygen in the regeneration air is consumed during the coke burn off period at the start of regeneration, it is desirable to hold the reactor completing regeneration in parallel with the reactor starting regeneration in order to maintain a minimum average outlet oxygen concentration of 50 percent of the normal. However, it would also be possible to bypass air around the reactor starting regeneration to accomplish this. If the oxygen concentration were allowed to fall to 0 percent, the fires in the direct combustion chambers downstream of the water would be extinguished. Since the dehydrogenation process referred to herein involves reacting the hydrocarbon feed at about a pressure below about 5.0 p.s.i.a., it is necessary to periodically pressure a reactor with air from approximately this 5.0 p.s.i.a to full regeneration pressure before a reactor can be regenerated. In order to effect this change in pressure and supply the regeneration air to the process, it is necessary to accomplish this pressuring prior to regeneration. This pressure change may be effected by means of a small valve, not shown, which bypasses the main inlet air valve. This valve supplies the required air at a constant rate to avoid upsetting the turbine. This same valve may also be used to supply the air purge flow that is required by the process. Because the reactor pressure must be reduced below about 5.0 p.s.i.a., at the end of the regeneration period, it is necessary to depressure the reactor directly to the atmosphere by means of a separate depressuring valve connected to the stack. After the reactor pressure falls to atmospheric pressure, the reactor is switched into the evacuation header system, not shown.

The regeneration effluent gases recovered from the reactor represented by box 52 at a temperature of about 1125° F. and at a rate of about 700,000 pounds per hour are passed by conduit 54 for further use in the process as hereinafter described.

The hot regeneration effluent gases in conduit 54 are passed first to indirect heat exchanger 40 to preheat the regeneration air as previously described and thereafter the gases cooled to a temperature of about 770° F. are passed to catalyst fines removal equipment such as cyclone separators, or any other suitable catalyst fines removal equipment designated 56. The regeneration effluent gases recovered from the catalyst fines removal system 56 are then passed by conduit 12 to the gas turbine. To gas fired turbine 14 additional fuel may be added by conduit 58 to raise the temperature of the gases and increase the B.H.P. (brake horsepower) developed not only to drive the air compressor coaxially connected thereto, but also to produce additional rated net shaft brake horsepower at power take-off 60 which may be used for other parts of the process. A portion of the additional brake horsepower furnished by the gas turbine is due to the negligible frictional pressure drop between the air compressor discharge and the turbine inlet because of the large open interconnecting piping as well as to the fuel fired in the turbine introduced by conduit 58. The turbine exhaust gases at a temperature of about 730° F. and a pressure of about 14 p.s.i.a. are removed at a rate of about 657,370 pounds per hour and passed by conduit 62 to direct fired burner 64. In direct fired burner 64 additional fuel or combustion gas is added by conduit 66 in sufficient quantity to be burned with the turbine effluent gases to further raise the temperature of the effluent gases to about 1338° F. The hot gases are then removed by conduit 68 and passed to a waste heat recovery or steam generation plant 70 for production of steam to be used in the process.

It is contemplated, however, within the scope of this invention, to pass the hot effluent regeneration gases from burner 64 at an elevated temperature of about 1338° F. to an additional indirect heat exchanger not shown but provided in conduit 42 for heat exchange with the compressed regeneration air recovered from indirect heat exchanger 40 by conduit 42. In this embodiment, the two indirect heat exchange steps may be so designed and proportioned in size and capacity that their combined effects would raise the temperature of the compressed regeneration air to at least about 500° F. prior to entering direct fired heater 44 or the heat exchanger may be adapted to indirectly heat the compressed regeneration air to a higher temperature, as discussed in connection with FIGURE 2. As indicated above, the additional indirect heat exchanger would be provided in conduit 42 to which the hot gases from burner 64 would be passed and thereafter the effluent gases from the heat exchanger would be refired in an additional direct fired heater similar to that shown in FIGURE 2, prior to being passed to the waste heat recovery or steam generation unit shown.

In addition to the above, a recycle line 72 is placed in parallel with the open bypass line 8 previously described. By controlling the flow of air from the gas turbine loop to the regeneration loop, the flow through the recycle line 72 can be controlled as desired. This system provides a system of maximum flexibility and is most practical when a recycle stream is desired in order to control the inlet oxygen concentration to the process or when a recycle stream is desired to prevent the oxygen concentration of the air to the turbine from falling below a certain level. By this method of operation, the oxygen content of the regeneration gases can be varied over a wide range of an extremely low value of 1 to 2 percent or less, up to 21 percent by volume.

Control valve 74 is provided in recycle line 72 responsive to flow recorder 76. The balance of flow of gases in conduit 72 and conduit 8 is so proportioned as to assure sufficient oxygen concentration in the regeneration effluent gases passed to the fired turbine to effect the necessary combustion or burning therein to develop the required power for the turbine. The remaining portion of the air from the compressor is combined with the recycle gases in the desired proportions in conduit 72 and passed to the regeneration loop of the process as hereinbefore described. The pressure balance in lines 72 and 8 may be so regulated as to permit flow of from about 0 percent and about 100 percent of the compressed air from the compressor through conduits 10, 8 and 12 to the fired turbine with the remaining portion of the pressurized air passed through flow recorder 76 to the regeneration loop of the process. Such a balance of flow of regeneration air and effluent recycle gases as described above precludes the possibility of passing an oxygen deficient stream to any part of the process which might precipitate shut down of the process. It is to be understood that any quantity of the regeneration air between about 0 percent and about 98 percent or higher in conduit 10 may be passed through conduit 8 to fired turbine 14, the quantity being governed by the concentrations of oxygen necessary in the gases passed to the fired turbine required for burning or the oxygen requirement of the process.

FIGURE 2 represents another embodiment of the present invention. In this embodiment a hot booster-compressor is employed in conjunction with a fired gas turbine-compressor in which regeneration air from the turbine compressor and the recycled regeneration effluent gases are passed directly to the hot booster compressor without susbtantially any intermediate cooling. Air at a rate of approximately 660,000 pounds per hour is admitted to the process loop by conduit 80 to compressor 82. The air compressor 82 of the gas turbine compresses approximately 660,000 pounds per hour introduced by conduit 80 to a pressure of about 78 p.s.i.a. and a temperature of about 500° F. This air flow includes process air loss that occurs during depressuring as well as plant and instrument air of about 4600 pounds per hour which is taken off at the discharge end of the air compressor by conduit 86. An unrestricted bypass conduit 88 is provided connecting the compressor discharge conduit 84 to the turbine combustion chamber inlet conduit 90 to maintain equal pressures at both points. Conduit 88 will either bypass air from the compressor 82 to the turbine 92 or recycle air to the process depending on the size of the gas turbine actually installed and the air requirements of the process. Fluctuation of the fresh inlet air to the turbine with changes in ambient temperature will also affect the recycle quantity. The compressed fresh air and the recycle effluent stream is combined and passed by conduit 84 at a temperature of about 530° F. directly to the hot booster compressor 94. The booster compressor 94 does the actual work of supplying the regeneration air to the process and the power requirements of the booster compressor are much less than the requirement of a low pressure regeneration air compressor because of the elevated pressure employed in the process. In this respect, the booster compressor provides only sufficient head to overcome the pressure drop in the regeneration system and returns the air to the turbine inlet at substantially the same pressure as the air compressor discharge. With the booster compressor installed in this manner, the regeneration system pressure drop can be varied to obtain the minimum investment. The booster compressor 94 raises the pressure of the air to about 94 p.s.i.a and a temperature of about 585° F. The compressed air leaves booster compressor 94 and is passed by conduit 96 to indirect heat exchanger 98 having a capacity of about 66 mm. B.t.u.'s per hour. In heat exchanger 98 the compressed regeneration air is further elevated in temperature by indirect heat exchange with the hot effluent regeneration air from the process as described hereinafter. In heat exchanger 98 the compressed regeneration air is raised to a temperature of about 818° F. and thereafter is passed by conduit 100 to a second heat exchanger 102. In heat exchanger 102 the compressed regeneration air is further elevated in temperature by heat exchange with hot combustion gases hereinafter more fully described to a temperature of about 913° F. The temperature to which the gas is heated by indirect heat exchanger 102 as compared to direct firing is determined by the allowable water partial pressure of the process. Thereafter the hot regeneration compressed gases are passed by conduit 104 to direct fired heater 106. In direct fired heater or burner 106 the remaining heat that is added to the regeneration air stream in order to elevate the temperature thereof to about 1175° F. is obtained by direct firing with a combustible fuel. In this step, suitable gaseous material, such as depropanizer tail gases, for example, or any other suitable fuel substantially free of solids, metals and sulfur is introduced by conduit 108 to the burner and fired to impart the necessary heat to the regeneration air. After the air has been sufficiently heated by burner 106 to regeneration temperatures of about 1175° F., the hot compressed regeneration air is then passed at a rate of about 717,700 pounds per hour through conduit 110 to the reactor or reactors requiring regeneration and contained within or represented by box 112. In this specific application, the reactor containing the bed of dehydrogenation catalyst to be regenerated is contacted with the preheated regeneration air to burn off the coke and simultaneously even out the temperature profile of the catalyst bed. The cyclic method for operating a plurality of fixed bed reactors wherein the reactor consecutively passes through reaction, purge, regeneration, purge and reaction is a part of this invention only to the extent that the regeneration gases are passed to the proper reactor or reactors at the proper time in order to purge the catalyst and remove the carbonaceous deposits therefrom, as well as to supply the necessary heat to the catalyst bed for effecting the dehydrogenation reaction. This invention is particularly applicable in a multiple reactor system, as previously described in connection with FIGURE 1. The regeneration effluent gases recovered from the reactors at a temperature of about 1125° F. and at a rate of approximately 700,000 pounds per hour are passed by conduit 114 to indirect heat exchanger 98. As previously described, the hot regeneration effluent gases in conduit 114 are passed to indirect heat exchanger 98 to preheat the regeneration air and thereafter the effluent gases at a temperature of about 895° F. are passed by conduit 116 to suitable catalyst fines removal equipment 118. Any suitable catalyst fines removal equipment, such as cyclone separators or the like may be employed in the process. The regeneration effluent gases recovered from catalyst separator 118 are then passed by conduit 90 to the burner or the gas fired turbine. As previously pointed out hereinbefore, a portion of these gases may be recycled and combined with the compressed regeneration air in conduit 84 by conduit 88 or all of the effluent gases may be passed to the gas fired turbine. The gas fired turbine 94 may be provided with additional fuel admitted by conduit 120 to raise the temperature of the gases and increase the brake horsepower developed by the turbine not only to drive the air compressor coaxially connected thereto, but also to produce additional shaft brake horsepower at the power take-off 122. The turbine exhaust gases at a temperature of about 796° F. and a pressure of about 14 p.s.i.a. are removed at a rate of about 657,000 pounds per hour and passed by conduit 124 to direct fired burner 126. In direct fired burner 126 additional fuel or combustion gas is added by conduit 128 in sufficient quantity to be burned with the turbine effluent gases to further elevate the temperature of the gases to about 1436° F. The hot gases are then removed from burner 126 by conduit 130 and passed to indirect heat exchanger 102 to elevate the temperatures of the compressed regeneration gases passed to the process, as hereinbefore described. The regeneration effluent gases are removed from indirect heat exchanger 102 by conduit 132 and passed to an additional direct fired burner 134 at a temperature of about 1336° F. In burner 134 additional fuel is added by conduit 136 to elevate the temperatures of the effluent regeneration gases by combustion of the added fuel to about 1506° F. The hot gases are then passed by conduit 138 to waste heat recovery equipment or steam generation plant 140. It is to be noted that provisions are made in the process of FIGURE 2 whereby indirect heat exchanger 102 and direct fired burner 134 may be eliminated with the hot effluent gases in conduit 130 passed through bypass conduit 142 to the waste heat recovery equipment 140. It is contemplated within the scope of this invention, represented by FIGURES 1 and 2, of treating the hot regeneration effluent gases recovered from the reactors for the removal of any entrained fines or solids such as catalyst fines and thereafter passing the thus treated effluent gases directly to the fired turbine or, in another embodiment, it is contemplated removing catalyst fines from the regeneration effluent gases prior to passing the effluent gases to the indirect heat exchange steps as hereinbefore described, and then to the gas fired turbine. In addition to the above, a parallel recycle line may be employed in the process of FIGURE 2, similarly to recycle line 72 provided and discussed in connection with FIGURE 1. While this embodiment provides a system or process of maximum flexibility of operation, it is not essential that this additional bypass line be incorporated in the process. However, in view of the flexibility of operation allowed by this embodiment, it is possible to incorporate the additional bypass line, such as conduit 72 shown in FIGURE 1, in either embodiment.

It is contemplated within the scope of this invention that the booster compressor may be located on the outlet side of the reactor instead of the inlet side, specifically discussed herein.

The great advantage of applicants' process is in its overall thermodynamic efficiency and savings in utility costs which is much greater than that of the prior art. This is possible since a higher regeneration pressure may be utilized, the power requirements of the process are more efficiently distributed and much less fuel is required to effect the required regeneration, as well as to supply the power requirements of the process. In addition, the necessary heat requirements and large volumes of regeneration air for contacting the catalyst are provided more efficiently than has been previously obtainable.

Various auxiliary equipment has been eliminated from the drawings as a matter of convenience and its use and location will become apparent to those skilled in the art. In addition, various alterations and/or modifications of the present invention will become apparent to those skilled in the art from the previous description without departing from the scope of this invention.

Having thus described our invention, we claim:

1. A process for supplying a gaseous material at an elevated pressure to a contact zone from which a hot effluent gas is removed, which comprises compressing gaseous material in a first compression zone, further compressing compressed gaseous material in a second and separate compression zone, passing compressed gaseous material from said second compression zone to a contact zone, effecting the desired contact in said contact zone, passing hot effluent gases from said contact zone to a fired turbine zone, expanding said effluent gases in said fired turbine zone to provide the power requirements of said first compression zone; and maintaining the pressure of the gases at the outlet of the first compression zone and the inlet to the turbine zone substantially equal by unrestricted flow of gases therebetween.

2. A process for supplying gaseous material at an elevated temperature and pressure to a contact zone from which a hot effluent gas is removed which comprises compressing a gaseous material in a first compression zone, further compressing compressed gaseous material in a separate booster compressor zone sufficient to overcome the pressure drop of the process, passing compressed gaseous material from said booster compressor zone in indirect heat exchange with hot effluent gases recovered from a contact zone, passing heat exchanged compressed gaseous material to a combustion zone, adding a combustible fuel to said combustion zone, elevating the temperature of said compressed gaseous material in said combustion zone by burning combustible fuel therein, passing compressed gaseous material at an elevated temperature from said combustion zone to said contact zone, effecting the desired contact in said contact zone, passing effluent gas from said indirect heat exchange step to a turbine zone, firing effluent gas in said turbine zone to generate power for at least said first compression zone and maintaining unrestricted flow of gases between said first compression zone and said turbine zone.

3. In a process employing a fired turbine-compressor prime mover for supplying an oxygen-containing gaseous material to a contact zone from which an oxygen containing effluent gas is removed, the improvement for operating the process at an elevated temperature and pressure which comprises compressing oxygen containing gaseous material in a compression zone of said prime mover, further compressing said oxygen containing gaseous material obtained from said first compression zone in a separate booster compression zone sufficient to overcome the pressure drop of the process, passing compressed oxygen containing gaseous material from said booster compressor zone to a heating step to elevate the temperature thereof, passing oxygen containing gaseous material from said heating step at an elevated temperature and pressure to said contact zone, passing an oxygen containing effluent gas from said contact zone to an indirect heat exchange zone in said heating step, passing effluent gases from said indirect heat exchange zone to said turbine zone, generating power in said turbine zone by firing and expanding effluent gases therein, utilizing power generated by said turbine zone to drive said compression zone of said prime mover, and maintaining a free flow of gases between the outlet of said prime mover compression zone and the inlet to said turbine zone.

4. A process for supplying a gaseous material at an elevated temperature and pressure to a contact zone from which a hot effluent gas is removed, which comprises compressing a gaseous material in a first compressor zone, lowering the moisture content of said compressed gaseous material within desired limits, further compressing compressed gaseous material of lower moisture content in a separate booster compression zone sufficient to overcome the pressure drop of the process hereindescribed, passing compressed gaseous material from said booster compression zone in indirect heat exchange with hot effluent gas, combining compressed heat exchanged gaseous material with a combustible fuel and passing the thus combined gases to a combustion zone to further elevate the temperature of said compressed heated gaseous material by combustion of said combustible material in the presence thereof, passing said compressed gaseous material at an elevated temperature from said combustion zone to said contact zone, effecting the desired contact in said contact zone, passing effluent gases at an elevated temperature from said contact zone to said indirect heat exchange step, combining effluent gases of reduced temperature from said indirect heat exchange step with a combustible material and passing the thus combined gases to a fired gas turbine, firing and expanding said combined gases in said turbine to generate power therein, utilizing power generated by said turbine to drive said first compression zone and maintaining the pressure of the gases at the first compression stage outlet and the inlet to the turbine zone substantially equal by free flow of gases therebetween.

5. A process for supplying a gaseous material at an elevated pressure to a contact zone from which a hot effluent gas is removed, which comprises compressing gaseous material in a first compression zone, further compressing compressed gaseous material in a second and separate compression zone, heating the compressed gaseous material to an elevated temperature above that obtained by said compression stages, passing the heated compressed gaseous material from said heating step to a contact zone, effecting the desired contact in said contact zone, passing hot effluent gases from said contact zone to a fired turbine power generation zone, firing and expanding said effluent gases in said fired turbine zone, said fired turbine zone providing power to drive said first compression stage, maintaining unrestricted flow of gaseous material between the outlet of said first compression zone and the inlet to said fired turbine zone and providing a controlled gaseous material flow parallel to the unrestricted gaseous material flow for passage of hot effluent gases from said contact zone to said second compression zone.

6. A process which comprises compressing air to an elevated pressure in a first compression zone, passing the compressed air to a booster compression zone, passing compressed air from said booster compression zone to an indirect heat exchange zone, heating compressed air in said indirect heat exchange zone, further heating indirectly heated compressed air by partial combustion thereof with a combustible fuel in a combustion zone, passing preheated air from said combustion zone to a conversion process for contact therein as desired, passing effluent gases containing air from said conversion zone at an elevated temperature to said indirect heat exchange zone, passing effluent gases from said indirect heat exchange zone to a fired turbine power generating zone, utilizing power developed by said turbine power generating zone to drive said first compression zone, maintaining unrestricted flow of air between the outlet of said first compression zone and the inlet to said fired turbine power generating zone and maintaining a controlled flow of gases parallel to said unrestricted flow between the inlet to the booster compressor and conversion zone effluent gases.

7. In a process for regenerating finely divided catalytic material contaminated with carbonaceous deposits from which a hot effluent gas is removed, the improvement which comprises compressing atmospheric air in a first compression stage to a pressure of about 78 p.s.i.a., passing compressed atmospheric air to a separate second compression stage, said second compression stage elevating the pressure of the compressed air sufficiently to overcome the pressure drop of the system, passing compressed atmospheric air from said second compression stage through a first indirect heat exchange zone in indirect heat exchange with hot effluent gases to elevate the temperature of said compressed air stream above about 500° F., further elevating the temperature of compressed air from said first indirect heat exchange step by combustion with a combustible fuel in a first combustion zone to a temperature of about 1200° F., passing heated compressed air from said first combustion zone in contact with said catalyst under regenerating conditions, passing air containing regeneration effluent gases at an elevated temperature of about 1150° F. through said first indirect heat exchange steps to reduce the temperature of the regeneration effluent gases to about 900° F. and elevate the temperature of the compressed air, passing regeneration effluent gases from said first indirect heat exchange step to a fired turbine power generating zone, firing regeneration effluent gases with a combustible fuel and expanding the same in said turbine zone to generate power to drive said first compression stage, equalizing the pressure between the outlet of said first compression stage and the inlet to said turbine power generating zone by providing flow of air therebetween, passing expanded combustion products from said fired turbine to a second combustion zone, elevating the temperature of expanded combustion products from said turbine by combustion with a combustible fuel to about 1450° F. in said second combustion zone, passing expanded effluent gases at an elevated temperature from said second combustion zone to a second indirect heat exchange zone in indirect heat exchange with said compressed atmospheric air, and passing expanded effluent gases from said second indirect heat exchange step to a steam generation zone wherein steam is generated for use in the process.

8. A method for regenerating a bed of catalytic material employed in a hydrocarbon conversion process wherein carbonaceous material is deposited on the catalyst which must be periodically removed, the improvement which comprises compressing atmospheric air to an elevated pressure in a first compression zone, passing compressed air from said first compression stage to a second and separate compression zone, passing compressed air from said second compression zone to an indirect preheat zone, passing compressed preheated air to a first combustion zone and further heating said preheated air by partial combustion with a combustible material in said first combustion zone, passing heated compressed atmospheric air in contact with said catalyst bed requiring regeneration to remove carbonaceous materials therefrom, passing regeneration effluent gases containing air at an elevated temperature to said indirect preheat zone, passing effluent gases of reduced temperature from said indirect preheat zone to a fired turbine power generating zone, firing and expanding effluent gases in said turbine power generating zone, utilizing at least a portion of said power to drive said first compression zone, utilizing another portion of said power to drive said second compression zone, and providing unrestricted flow of air between the outlet of said first compression stage and the inlet to said fired turbine power generating zone in accordance with the demands of the process.

9. In a process wherein a catalyst becomes contaminated with carbonaceous deposits and periodically requires regeneration to remove said carbonaceous deposits, the improvement for effecting said regeneration at elevated pressures and temperatures which comprises expanding oxygen-containing regeneration effluent gases obtained from a bed of regenerated catalyst at an elevated temperature and pressure in an energy generation zone, said energy generation zone providing the energy requirements to compress regeneration air sequentially to an elevated pressure in at least two compression zones, passing compressed regeneration air in indirect heat exchange with regeneration effluent gases from said catalyst regeneration step, passing said preheated regeneration air to a second heating zone, further heating said regeneration air in said second heating zone by partial combustion of a portion thereof with a combustible fuel, passing heated regeneration air from said second heating zone to a catalyst bed requiring regeneration to remove carbonaceous deposits therefrom, recovering regeneration effluent gases and employing the same as hereinbefore described, and providing unrestricted flow of gaseous material between said first compression zone and said energy generation zone.

10. An improved method for contacting finely divided solids with an oxygen containing gas at elevated temperature and pressure, which comprises compressing oxygen-containing gaseous material to an elevated pressure of from about 70 to about 90 p.s.i.a. in a first compression zone, passing compressed gaseous material to a second compression zone, heating compressed gas recovered from said second compression zone to an elevated temperature of about 1000° F. by indirect heat exchange with oxygen-containing effluent gases hereinafter described, further heating compressed oxygen-containing gases recovered from said indirect heat exchange step by partial combustion with a combustible material to a temperature of about 1200° F., passing said heated oxygen-containing gas in contact with said solids at a rate sufficient to effect the desired contact, recovering oxygen-containing effluent gases from said solids at an elevated temperature and pressure, passing recovered effluent gases to said indirect heat exchange step, passing effluent gases from said indirect heat exchange step at a reduced temperature of about 900° F. to a fired turbine power generating zone connected to said first compression zone, expanding effluent gases at an elevated temperature in said fired turbine power generating zone, passing expanded oxygen-containing effluent gases from said turbine zone at a temperature of about 800° F. to a combustion zone, heating said turbine effluent gases by partial combustion with a combustible material to an elevated temperature of about 1500° F. in said combustion zone, employing said gases at an elevated temperature in said process and providing unrestricted flow of gases between said first compression zone and said fired turbine zone.

References Cited in the file of this patent

UNITED STATES PATENTS

| | | |
|---|---|---|
| 2,167,655 | Houdry et al. | Aug. 1, 1939 |
| 2,262,195 | Noack | Nov. 11, 1941 |
| 2,310,244 | Lassiat | Feb. 9, 1943 |
| 2,758,979 | Guthrie | Aug. 14, 1956 |
| 2,831,041 | Sieg et al. | Apr. 15, 1958 |